Sept. 24, 1946.       G. E. KING        2,408,217
CONTROL SYSTEM
Filed June 27, 1944

INVENTOR
*George E. King.*
BY
*Paul E. Friedemann*
ATTORNEY

Patented Sept. 24, 1946

2,408,217

UNITED STATES PATENT OFFICE 2,408,217

CONTROL SYSTEM

George E. King, Swissvale, Pa., assignor to Westinghouse Electric Corporation, East Pittsburgh, Pa., a corporation of Pennsylvania Application June 27, 1944, Serial No. 542,402

3 Claims. (Cl. 172—179)

The present invention relates to variable voltage control systems and more particularly to electric motor control systems for automatically controlling the operation of motors used to drive machine-tool elements, paper mills and the like, elevators, electrically operated shovels and so on.

This invention provides certain improvements in variable voltage control systems in which rotating regulators are employed to regulate a given quantity, and the invention as hereinafter described and as illustrated in the drawing is specifically directed to the regulation of the speed of rotation of a direct-current motor. However, it will be apparent to one skilled in the art that the invention is not limited to speed regulation alone since various modifications of the system may be made to control the motor torque or power. It will further be apparent that the invention is not necessarily limited to motor control since automatic regulation of the voltage current or electrical power supplied to an electrical load of substantially any type susceptible of regulation may be had.

The improvements provided by the present invention insofar as increased efficiency and speed of operation are concerned in motor control systems, for example of the type disclosed in applicant's Patent No. 2,205,204, are readily apparent. In general, such systems comprise a direct-current motor, a main generator connected in series circuit relation with the motor, a regulating generator for controlling the electrical output of the main generator, in response to a changing motor characteristic which it is desired to regulate and an exciter for supplying electrical energy to the electrical system, or some portion thereof, depending upon the arrangement of the component parts.

The regulating generators used in such systems are generally provided with a field winding energized proportionally to the motor current, a field winding energized proportionally to the motor armature terminal voltage and differentially related to the current energized field, the differential magnetomotive force of the voltage and current energized fields is indicative of the counter emf of the motor and hence indicates the speed of the motor, and two field windings each connected in series with a control field winding for the main generator. The series connected regulating generator and main generator field windings are usually arranged in opposite legs of a conventional bridge circuit having resistors in the remaining two opposite legs and the regulating generator armature is connected across the output terminals of the bridge. The input terminals of the bridge circuit are connected to a suitable source of direct current which may be varied to control the excitation of the main generator control fields and in view of the series connection of the two regulating generator fields with the two main generator control fields the same exciting current from the external source flows therethrough. The differential magnetomotive force of the voltage and current energized regulating generator fields are opposed to the magnetomotive force resulting from the external excitation of the two regulating generator fields in the bridge circuit. Thus when the motor is operating at a proper speed as indicated by the excitation of the main generator control fields the total flux in the regulating generator is zero. The regulating generator armature winding by reason of its connection in the bridge circuit is in such circuit relation with its two field windings in the bridge circuit that the generator is substantially self energizing and may therefore have an electrical output independent of the external excitation of its two windings in the bridge circuit, or of its voltage and current energized windings. Thus upon a departure in balance of the mentioned differential magnetomotive force against the magnetomotive force of the two regulating generator bridge circuit windings, an output of the regulating generator is fed into the bridge circuit in a direction to correct the existing unbalance. When a balance in the regulating generator windings is again reached this generator maintains the corrective current necessary to keep such balance until a further disturbance occurs.

While this practice of connecting field windings of the regulating generator in series with the generator control fields provides an accurate measurement of the generator control field current, it has been found that the system during reversing cycles tended slightly to be sluggish. This sluggishness of operation resulted because the currents in the regulating generator field windings could change no faster than those in the generator control field windings, by reason of their series connection. While the generator control field windings are designed to have a fairly low impedance, the impedance of these windings is, none the less, considerably higher than that required for the regulating generator fields. Thus, even though the field windings of the regulating generator are of a character that permits a faster change of current than those of the main generator, the series connection of the windings of these two machines prevented such a condition.

It is highly desirable that machine tools have a high production capacity. On such machines, for example as metal planers, as the machine is being operated with fairly short strokes, the reversing cycle of the motor may comprise a substantial portion of the time required for a complete operating cycle. For this reason, it is necessary that the motor be decelerated, stopped and accelerated in a reverse direction in as little time as the electrical and mechanical characteristics of the equipment will permit. This has been accomplished in part, in the past, by designing faster control fields for the main generator and also by controlling the resistance of the discharge circuits for these generator fields so that the flux decay in the generator fields may be as rapid as can be attained without producing current peaks on deceleration near or above the maximum limits that the motor energized by the generator can commutate.

With the present scheme of control, a forcing action of the generator control fields is obtained by removing the regulating generator fields from their series circuit relationship with the generator control fields and placing a single field elsewhere in the system that it may yet be energized by currents proportional, if not equal, to those flowing through the generator shunt field windings. With such an arrangement, the current flow through the newly located field of the regulating generator may change as rapidly as the impedance of the field will permit and produce corrective currents far in advance of those which were attainable with the system of control previously described.

A principal object of this invention is to increase the speed of regulation of a generator employed in a variable voltage control system.

Another object of this invention is to provide a variable voltage control system in which the rate of change of currents in the main generator supplying the system is increased.

Other objects and advantages will become apparent upon a study of the following disclosure when considered in conjunction with the accompanying drawing in which.

Figure 1:
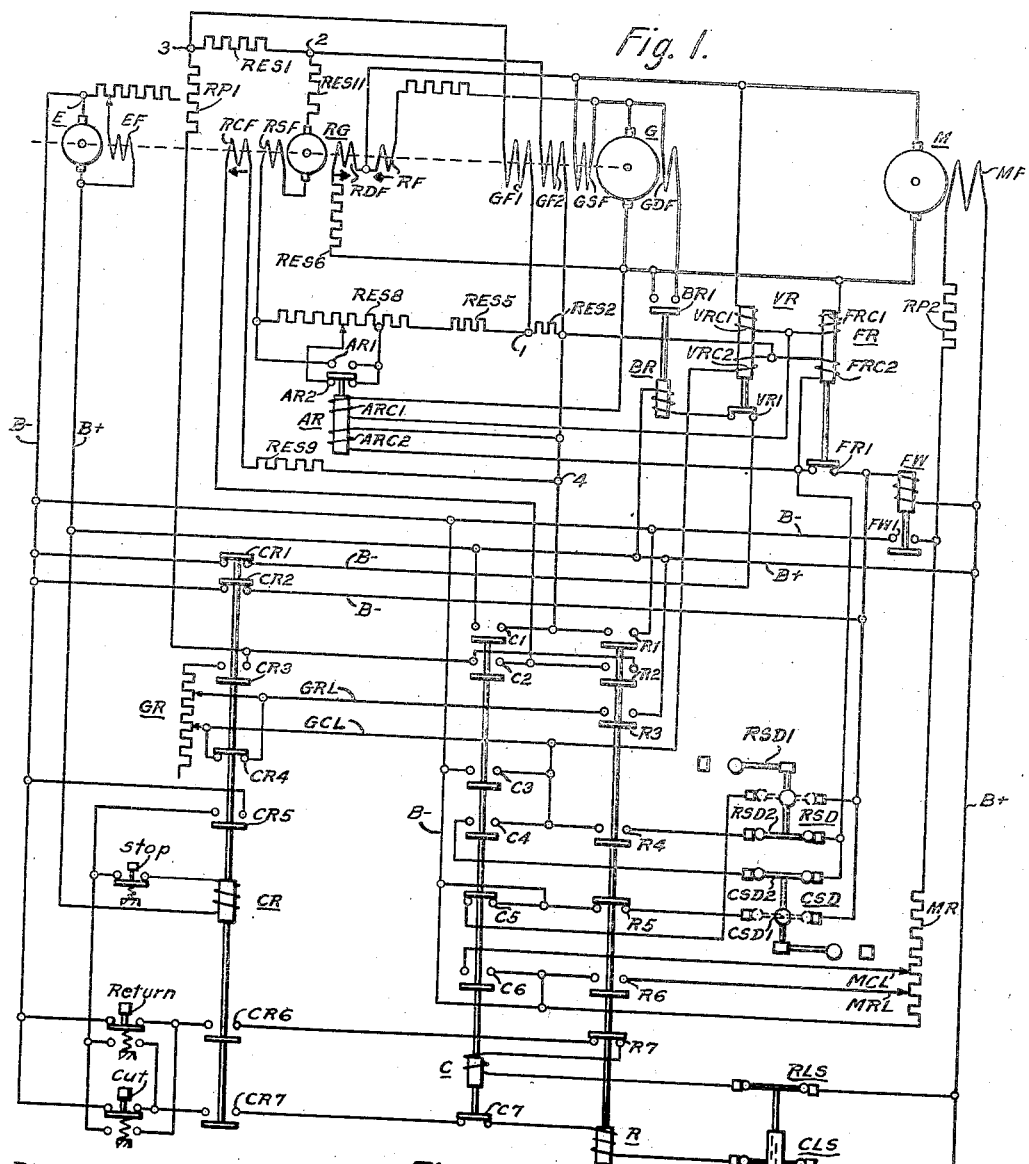
Figure 1 is a schematic diagram of a complete system of control for a reversible motor operating a planer platen or other tool actuating machine embodying the novel features of this invention.

Referring now to Fig. 1 of the drawing, the specific system illustrated therein is for controlling a direct-current motor of the type used, for example, in operating a planer platten. This system comprises generally: (1) A direct-current motor M having a separately excited field winding MF; (2) A variable voltage direct-current generator G having a series connected field winding GSF, two separately excited control field windings GF1 and GF2, and a shunt connected differential or suicide field winding GDF; (3) A regulating generator RG provided with a series connected field winding RSF, a separately excited control field winding RCF, a separately excited, differentially connected field winding RDF and a separately excited field winding RF; (4) An exciter E which supplies the direct-current potential of a constant value to the system and which has a field winding EF connected in shunt relationship with the armature thereof; (5) A magnetic controller which provides certain desirable automatic control features and which comprises the cut and return directional contactors C and R, a control relay CR, an automatic relay AR, a break relay BR, a voltage relay VR, a field weakening relay FR and a field weakening contactor FW; and (6) The limit switches which comprise the cut and return limit switches CLS and RLS and the cut and return slowdown limit switches CSD and RSD.

The motor and the main generator in Fig. 1 are connected with their armatures in series circuit relationship. As will be seen more conveniently from Fig. 2, the field windings GF1 and GF2 of the main generator are connected in opposite legs of a conventional Wheatstone bridge circuit, having for its other two opposite legs, the bridge balancing resistors RES1 and RES2. The input terminals of this bridge circuit are identified as 3 and 4 and the output terminals of the bridge are identified as 1 and 2. The armature winding of the regulator generator and the winding RSF in series therewith, are connected in series with the resistor elements RES5 and RES11 which are of predetermined fixed value and the resistor RES8 which is varied by means of the contacts AR1 and AR2 across the galvanometer terminals 1 and 2 of the bridge circuit. The control field winding RCF is connected in series with the sensitivity adjusting resistor RES9 across the conductors supplying the bridge circuit. The differential field winding RDF is connected with its series sensitivity adjusting resistor RES6 across the motor armature as will be seen from Fig. 1 and the separately excited field winding RF is connected in shunt relationship with the main generator series field winding GSF and, hence, is excited in proportion to the current flowing therethrough.

The regulating generator RG is preferably provided with operating characteristics which, while unfavorable from an operating point of view insofar as a machine such as the main generator G is concerned, are most favorable for the regulating generator. Normally stable operation of a direct-current generator is obtained only if the slope of the resistance line of the field circuit is less than that of a line tangent to the initial substantially straight line portion of the no-load saturation curve of the machine. If the resistance is less, the generator can have an open circuit voltage which is determined by the intersection of the resistance line with the saturation curve. If the resistance is higher, and, consequently, the slope of the resistance line higher than the initial straight line portion of the saturation curve, the generator voltage cannot build up. If the slope of the resistance line just equals the slope of the initial portion of the saturation curve, that is, is tangent to this portion of the saturation curve, the generator can theoretically have an open circuit voltage equal to any of the points of tangency. It is the latter of the three mentioned conditions for which the regulating generator is preferably adjusted. The action of the field windings RDF and RF together with that of the control field winding RCF select the proper operating point of this generator along the tangent curve and maintain this operating point constant for any setting of the generator rheostat GR.

As previously noted, the armature winding of the regulating generator, the series field winding RSF and a group of resistors RES5, RES8 and RES11 are connected in series across the galvanometer terminals 1 and 2 of the Wheatstone bridge circuit. Normally, the resistor RES8 is substantially entirely shunted from the series circuit by the contact AR1 of the automatic relay AR. The value of the resistance in this series circuit is preferably such, that when adjusted to obtain the desired tangent relationship of the resistance line of the regulating generator field circuit with the no-load saturation curve, that the total voltage across the galvanometer circuit is zero for a predetermined operating condition.

Since in the present system of control it is desired to regulate the speed of the motor M, an indication of the counter voltage of the motor is desired. This is obtained by connecting the differential field winding RDF across the motor armature terminals and by connecting the field winding RF across the main generator series field winding GSF. In this manner, the differential field winding is excited by a voltage proportional to the motor armature terminal voltage, and the field winding RF has a voltage applied thereacross proportional to the load current of the series motor generator circuit. Since the field windings RDF and RF are in electrical opposition, the differential magnetomotive force produced by these fields is an indication of the speed of the motor. The control field winding RCF, by reason of its connection across the input terminals to the bridge circuit, is energized by a voltage proportional to the voltage applied to the field windings GF1 and GF2 of the main generator and, hence, produces a magnetomotive force which is an indication of the selected speed of operation of the motor. The magnetomotive forces produced by the control field winding RCF and the electrically opposed field windings RDF and RF are in opposition and the differential of these magnetomotive forces is an indication of the departure of the motor speed from the selected speed of operation, as determined by the setting of either of the cut or return leads GCL or GRL of the generator rheostat GR. The differential magnetomotive force of the three regulator generator field windings causes a corrective current, produced by the regulator generator, to flow in the Wheatstone bridge circuit in such a direction as to produce the necessary change in excitation in the main generator field windings GF1 and GF2, that the motor speed may be brought to its selected value.

Before proceeding with a discussion of the operation of the system as shown in Fig. 1, a description of the various contactors and relays comprising the magnetic controller will probably be desirable.

The cut and return directional relays C and R are provided primarily to establish the proper polarity of the Wheatstone bridge circuit and, hence, the main generator by controlling the direction of flow through the field windings GF1 and GF2 thereof, and to establish portions of the control circuits for the field weakening contactor FW, the field weakening relay FR and the voltage relay VR. These contactors also control the degree of excitation of the generator and motor field winding through the medium of the generator field winding rheostat GR and the motor field winding rheostat MR. Each of these contactors is provided with a single coil which is interlocked with the other contactor and which are each selectively connected across the exciter busses B+ and B— through operation of either the cut and return push buttons or operation of the cut and return limit switches CLS and RLS.

The control relay CR, during periods when the motor generator system is being started and during periods when the planer platen is desired to be stopped with the generator system still operating, provides circuits to control the break relay BR to connect the differential or suicide field GDF of the main generator across the armature thereof to prevent creeping of the motor, and provides a circuit for the coil of the field weakening contact FW across the positive and negative conductors B+ and B— to close the contacts FW1 of this contactor and short the motor rheostat MR from the circuit of the motor field winding MF, thus applying full field excitation to this winding.

The field weakening contactor FW when closed, as just explained, shunts the motor rheostat from the field circuit of the motor and when open, removes the shunt circuit and thus connects this rheostat in the circuit.

Figure 2:
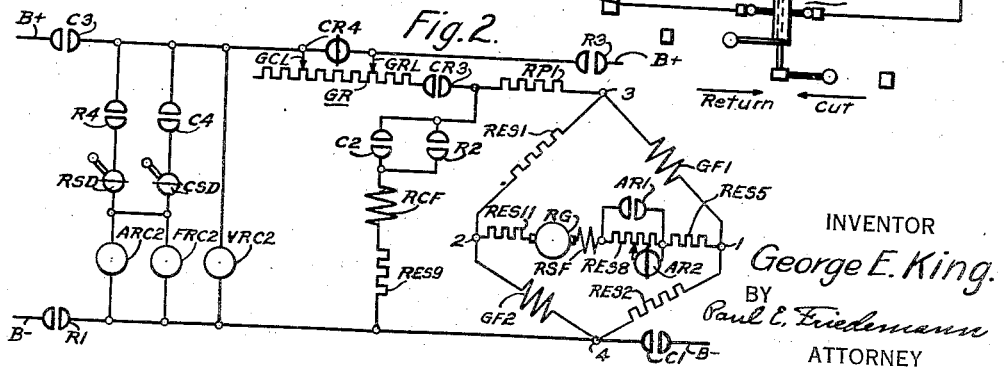
Fig. 2 is an elemental diagram of a portion of the system of Fig. 1 and illustrates the novel features of this invention.

The field weakening relay FR is provided with the contacts FR1 which during periods of acceleration beyond predetermined speeds of the motor are open, thereby permitting the field weakening contactor to drop out and weaken the motor field winding. This relay is provided with two coils FRC1 and FRC2. The coil FRC2, as will be seen more clearly from Fig. 2, is energized by the exciter voltage and the coil FRC1, as will be seen in Fig. 1, is energized by a voltage proportional to the voltage applied across the motor armature. Both coils of this relay must be energized before this relay picks up. The coil FRC2, immediately upon operation of either of the contactors C and R, has the exciter voltage applied thereacross. The coil FRC1 during periods of acceleration is energized by the increasing voltage across the motor generator series circuit. Thus, a slight time delay is obtained during acceleration, as well as deceleration, before this relay picks up or drops out.

The voltage relay VR together with the CR contactor controls the energization of the coil of the break relay BR through its contacts VR1. This relay, in a manner similar to the field weakening relay FR, is provided with two coils VRC1 and VRC2, the coil VRC1 being responsive to the voltage across the motor generator series circuit and the coil VRC2 responding to the exciter voltage. The coil VRC2 of this relay when energized causes the relay to pick up. Coil VRC1 alone will hold the relay up.

The automatic relay AR varies the resistance of the discharge circuit for the generator fields GF1 and GF2 and for the regulating generator field RSF. As previously explained, the purpose of changing this resistance in the field discharge circuit is to obtain a more rapid rate of decay of the generator field flux. This automatic relay has two coils. The main coil ARC2 is connected across the exciter and responds to exciter voltage. The other coil or holding coil ARC1 responds to the voltage across the motor generator series circuit. This relay picks up immediately upon the energization of the coil ARC2 when either of the contactors C or R operate, and it is held in by the holding coil ARC1 during reverse cycles until the generator voltage has declined to a sufficient value to permit the insertion of more resistance in the field discharge circuits, thus tending to force the deceleration and acceleration at the end and the beginning of each direction of movement of the planer platen.

It will be understood that the generator system of Fig. 1 is to be driven by a constant speed prime mover connected to the common shaft indicated by the dotted line intersecting the axes of the three generators. Such prime mover together with its control circuits have not been shown for the purpose of simplifying the illustration of the invention. Similarly, it will be understood that inching operation of the planer platen may be obtained by installing suitable inching push buttons in the control system in the manner shown, for example, in the applicant's Patent No. 2,205,204. These have also been omitted from the system in an effort to simplify the illustration of the invention.

To operate the system the prime mover (not shown) driving the system of generators is brought up to speed. A voltage is thus applied by the exciter across the conductors B+ and B—. The BR relay thus picks up, since the coil thereof is connected across the busses B+ and B— through the now closed contacts VR1 and CR1 and closes its contact BR1 to connect the differential field winding GDF of the main generator across this generator. Thus, any voltage which tends to build up in the generator due to residual magnetism is opposed by the action of the differential field winding and hence, no voltage or at least insufficient voltage to cause operation of the motor is applied across the motor armature terminals. At the same time the field weakening contactor FW is connected across the positive and negative busses through a circuit which includes the now closed contact CR2. This closes the contacts FW1 and shunts the motor rheostat MR thereby applying that portion of the exciter voltage to the generator field winding MF as determined by the value of the permanent resistor RP2. The initial direction of the planer platen can be selected by the cut and return push buttons, provided the planer table or platen is between the limits of its travel.

Pressing the cut push button closes the back contacts thereof and connects the coil of the control relay CR through the stop push button across the exciter busses B+ and B—. This relay immediately picks up, closing its contacts CR3, CR5, CR6 and CR7, and opening its contacts CR1, CR2 and CR4. An instant thereafter, while the cut push button is yet depressed and the circuit through the contacts CR7, now closed to the coil of the return contactor R, open, the cut contactor C picks up since its coil is energized through a circuit across the positive and negative busses which includes the return push button, the now closed contact CR6, back contact R7 and the return limit switch RLS. This opens the circuit for the coil of the return contactor R at contacts C7 thus preventing this contactor from picking up and at the same time establishes a second circuit for the coil of the field weakening contact FW to hold this contactor in, which includes the contacts C3, C4, contacts CSD2 for the cut slowdown limit switch CSD and the contacts FR1 of the field weakening relay FR which are yet closed. Since the contacts C1 and C3 of the contactor C are now closed and the contactors CR3 of the control relay are closed, a voltage is applied across the Wheatstone bridge circuit and this voltage is determined by the setting of the lead GCL for the generator rheostat. The field windings of the main generator are thus energized and current begins to flow through the motor armature. The speed of the motor thus builds up to its full field speed and the motor is accelerated under the influence of a high torque. The voltage relay VR picks up immediately when the main generator shunt fields are energized, thus opening the contacts VR1 and open circuiting the coil of the break relay BR. Thus the differential or suicide field is instantly removed from the generator circuit. When the main generator voltage builds up to a predetermined value, the field weakening relay picks up opening its contacts FR1 thereby opening the circuit to the field weakening contactor FW. This contactor immediately drops out, opening its contacts FW1 and inserting the motor rheostat in the circuit of the motor field MF. The resistance now in the motor field circuit is determined by the setting of the motor rheostat cut lead MCL. The motor thus accelerates to the speed determined by the rheostat setting. Immediately upon closing of the contacts C4 of the contactor C, the coil ARC2 of the automatic relay is energized and this relay picks up, closing its contacts AR1 and decreasing the resistance across the galvanometer terminals of the bridge circuit to the predetermined value for normal operation.

Near the end of the cut stroke, the cut slowdown limit switch CSD is operated. This opens its contacts CSD2 and closes its contacts CSD1. Closing of the contacts CSD1 establishes a circuit through the contacts R5 and the contacts CSD1 for the coil of the field weakening relay. This relay immediately picks up and shunts the motor rheostat MR from the circuit and thus near the end of the cut stroke causes the planer motor separately excited field MF to build up to full strength. The motor now slows down to full field speed. At the same time, the coil FRC2 of the field weakening relay FR is deenergized and this relay drops out closing its contacts FR1. As the planer platen reaches the extreme limit of its cut stroke, the cut limit switch is operated. This deenergizes the coil of the cut relay C which drops out and closes its contacts C7 causing the return contactor R to pick up. This closes the contacts R1 and R3 and reverses the polarity of the bridge circuit. At the same time, the excitation of the bridge circuit is increased since the current supplied to the bridge circuit is now controlled by the setting of the return lead GRL of the generator rheostat and less resistance is in series with the bridge circuit. Also a circuit is established to prevent the field weakening contactor FW from dropping out. This circuit includes the contacts R3, generator return lead GRL, a portion of the generator rheostat GR, the generator cut lead GCL, contact members R4, contact members RSD2 of the return slowdown limit switch, contact members FR1 and a coil of the field weakening contact FW. The motor is thus accelerated in the reverse direction at full field speed and when the generator voltage builds up sufficiently, the contact members FR1 open and the planer platen is driven in the return direction at a speed determined by the setting of the rheostat leads GRL and GCL.

With the system just described, when the speed of the planer motor is correct for the setting of the rheostat, the three sets of regulator generator fields balance each other and no voltage is generated in the generator by the action of these field windings. The voltage across the output terminals of the bridge circuit is therefore zero. Should the motor speed attempt to change, the regulator generator fields become unbalanced and the regulator generator generates a voltage causing current to flow through the Wheatstone bridge circuit in the direction required to hold the planer motor speed constant and in accordance with the setting of the rheostats.

Because the main generator is separately excited, variable voltage is easily obtained by means of a rheostat such as GR in series with the main generator control field circuits. Part of the speed range is obtained by varying the main generator voltage and maintaining full field on the planer motor, and the rest of the speed range is obtained by weakening the planer motor field and maintaining full voltage on the main generator.

Tests made with a system according to this invention indicated that measurable increases in the speed of reversing the motor could be obtained. With a system connected according to that mentioned in the preceding pages, in which the control field windings of the regulating generator were connected in series with the control field windings of the main generator, it was found that the motor required 1.76 seconds to accelerate to 765 R. P. M. or 90 per cent of the full testing speed of 850 R. P. M. With the system provided by this invention, the motor accelerated to 765 R. P. M. in 1.25 seconds or 71 per cent of the time required with the standard connections. With the connections according to this invention, it was found that the regulating generator was actually forcing the acceleration, whereas with the connections of the previously described prior art system, the regulating generator current was negative for a large portion of the reverse cycle thus tending to retard if not actually retarding the acceleration.

Further comparative tests made with the former system and the system according to this invention, while reversing the motor from 1,200 R. P. M. in one direction to 1,080 R. P. M. in the opposite direction, indicated that with the system according to this invention, the motor accelerates from rest to 1,080 R. P. M. in 77 per cent of the time required with the former system and reverses within the speed limits mentioned in 81 per cent of the time required with the former system.

The foregoing disclosure and the showings made in the drawing are merely illustrative of the principles of this invention and are not to be interpreted in a limiting sense. The only limitations are to be determined from the scope of the appended claims.

I claim as my invention:

1. In a system of control for a motor, the combination of, a generator having a pair of field windings, a motor directly connected to be energized by the generator, an electrical bridge circuit including said generator field windings in opposite legs thereof and having electrical bridge balancing elements in the remaining two opposite legs, a source of electrical energy for energizing the bridge circuit, a regulating generator including a series connected field winding and three separately excited field windings, said regulating generator including the series field winding being connected across the output terminals of said bridge circuit, two of said separately excited field windings being differentially connected to the motor-generator circuit, one winding being connected to be energized in an amount proportional to the current in the motor-generator circuit and the other winding being connected to be energized in an amount proportional to the motor armature terminal voltage, and the third separately excited field winding being connected in a circuit disposed across the input terminals of said bridge circuit.

2. In a system of control for a motor, the combination of, a generator having a pair of field windings, a motor directly connected to be energized by the generator, an electrical bridge circuit including said generator field windings in opposite legs thereof and having electrical bridge balancing elements in the remaining two opposite legs, a source of electrical energy for energizing the bridge circuit, a regulating generator including a series connected field winding and three separately excited field windings, said regulating generator including the series field winding being connected across the output terminals of said bridge circuit, two of said separately excited field windings being differentially connected to the motor-generator circuit one winding being connected to be energized in an amount proportional to the current in the motor-generator circuit and the other winding being connected to be energized by a voltage proportional to the motor armature terminal voltage, and the third separately excited field winding being connected to be energized in an amount proportional to the voltage applied across said bridge circuit by said source of electrical energy.

3. In a system of control for a direct current motor, the combination of, a direct current motor having an armature winding and a field winding, a main generator having an armature winding and a pair of field windings, circuit means electrically connecting the armature winding of said generator and the armature winding of said motor in series circuit relationship, an electrical bridge circuit, said pair of generator field windings being connected, in opposite legs of the electrical bridge circuit, a pair of electrical bridge balancing elements connected in the remaining opposite legs of the bridge circuit, a regulating generator having an armature winding, a field winding in series with the regulating generator armature winding and three separately excited field windings; circuit means connecting the armature winding and series field winding of the regulating generator across the output terminals of said electrical bridge circuit, means for adjusting the resistance of the series field circuit of the regulating generator such that the resistance line thereof is tangent to the initial straight line portion of the no-load saturation curve of the regulating generator, circuit means connecting one of said separately excited field windings of the regulating generator to the motor-generator armature circuit to be energized in an amount proportional to the current flowing in said circuit, circuit means differentially connecting another separately excited field winding of the regulating generator with respect to the current energized field winding, to the motor-generator armature circuit to be energized in an amount proportional to the motor armature terminal voltage, circuit means connecting the third separately excited field winding of the regulating generator across the input terminals of the electrical bridge circuit, and means for supplying direct current to said bridge circuit and said motor field winding.

GEORGE E. KING.